Oct. 31, 1961   E. M. GRAHAM   3,006,270
ELECTRIC GRILL WITH REMOVABLE GRIDDLE
Filed Dec. 29, 1959
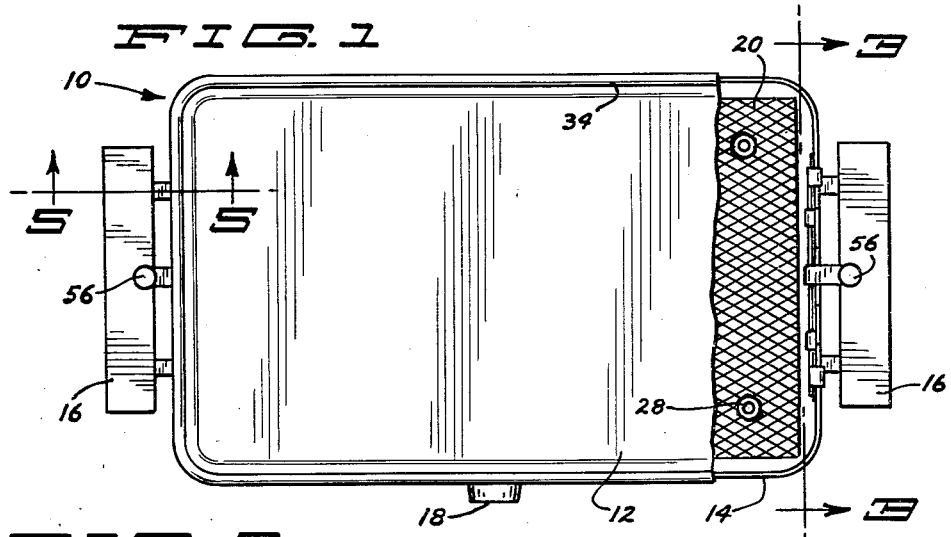
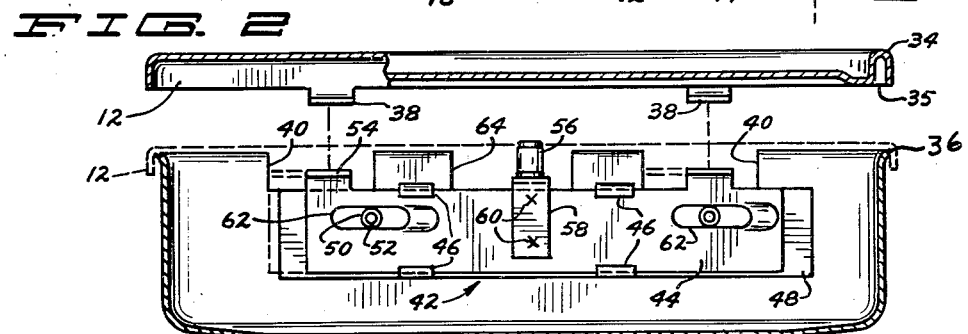
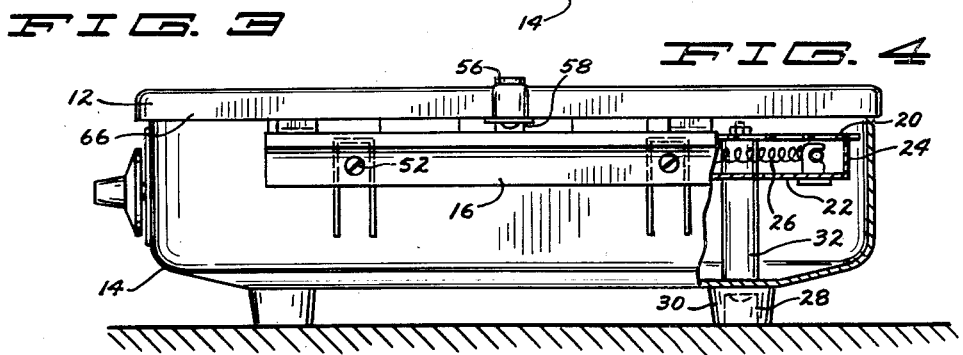
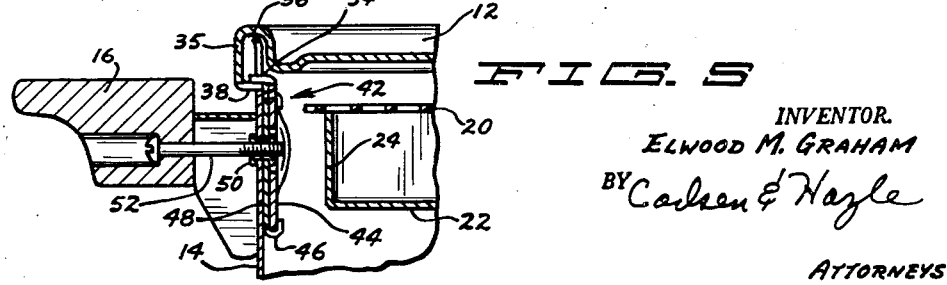
INVENTOR.
ELWOOD M. GRAHAM
BY Carlsen & Hazle
ATTORNEYS

United States Patent Office 3,006,270
Patented Oct. 31, 1961

3,006,270
ELECTRIC GRILL WITH REMOVABLE GRIDDLE
Elwood M. Graham, Hopkins, Minn. (% The M. H. Graham Corp., 2900 Emerson Ave. S., Minneapolis 8, Minn.)
Filed Dec. 29, 1959, Ser. No. 862,544
3 Claims. (Cl. 99—425)

This invention relates to electric grills and particularly to improvements therein for removably attaching a griddle.

Electric grills with removable or detachable griddles are, per se, old. This invention provides improvements in the means for attaching a stainless steel griddle to a grill supporting body.

Accordingly it is an object of the present invention to provide in an electric grill improved locking means for removably attaching a griddle to a support body.

This and other more detailed and specific objects will be disclosed in the course of the following specification, reference being had to the drawing, in which:

FIG. 1 is a plan view of an electric grill with a cutaway portion showing the present invention in a first and exemplary embodiment.

FIG. 2 is a partial plan view of a typical griddle showing the exemplary catch means on one end portion thereof.

FIG. 3 is an enlarged vertical sectional view taken along line 3—3 in FIG. 1 and showing the constructional details of the first embodiment.

FIG. 4 is an enlarged end view of the FIG. 1 grill with a cutaway section showing how the heating unit is mounted.

FIG. 5 is an enlarged vertical sectional view showing the interengagement of the griddle catch means and the body latch means as taken along line 5—5 in FIG. 1.

With more particular reference now to the appended drawing like numerals denote like parts and structural features in the various views. A grill 10 has a detachable griddle or cooking member 12 supported on a body member 14 which has the usual carrying handles 16 and thermostat control knob 18. An expanded aluminum heating element protection sheet 20 is fixedly mounted over the heat reflective plate 22 and is contiguous with the upper edges of the collar-forming heat-reflective upturned flange 24 integrally formed at the outer edges of the reflective plate. The usual coiled high resistance electrical heating wire 26 is mounted on ceramic spacers attached to the plate 22 in the usual manner. The wire is electrically heated to a thermostatically limited temperature as selected by the knob 18 in any well known manner. The internal plates are supported by a plurality of bolts 28, each extending from the legs 30 through the body, thence through a pair of ceramic spacers 32 to the upper side of the sheet 20. Suitable fastening means are provided for keeping the plates 20 and 22 rigidly associated with the bolts.

The griddle 12 has an upwardly-extending integrally-formed ridge 34 circumscribing the griddle for retaining grease and cooking oils thereon. The downwardly opening grooved portion 35 thereof is adapted to fit over the upper peripheral edge 36 of the body 14. At each end of the griddle adjacent a handle 16 there are a pair of integrally formed inwardly extending catch means 38 which respectively extends through the body notches 40 when the griddle is fitted on the edge 36.

The body latch means 42 includes a latching member 44 slidably mounted on the bent over tabs 46 of the slide support member 48. The member 48 is fixedly attached to the body 14 by tight fitting internally threaded sleeves 50. The handle mounting bolts 52 extend from the handles 16 through the sleeves 50 and inside the body 14. Two outwardly extending latch means 54 are formed on the upper edges of the member 44 and spaced vertically to be slightly above the griddle catch means 38 when the griddle is properly seated on the body 14. A latch operating knob 56 is provided with each latch means 42 and is connected to the latching member 44 by a connecting bar 58 bent to clear the under outward lower edge of griddle 12. The bar 58 is riveted to the latching member 44 as at 60. By moving the knobs 56 to the right as viewed in FIG. 3 the latch means 54 slide over the griddle catch means 38 securing the griddle to the body as best seen in FIG. 5. Both latch means 42 are independently operable and both must be operated to either secure or detach the griddle from the body. Releasing the griddle merely requires that the knobs 56 be moved to the left as seen in FIG. 3.

The latching mmber 44 sliding movement is limited by the handle supporting bolts 52 engaging the extreme ends of the elongated apertures 62 in each latching member. This prevents the connecting bar 58 from engaging and denting the notch 64 vertical sides to preserve the appearance of the unit.

As best seen in FIG. 4 the griddle 12 depending flange 66 partially conceals the latch means 42 including the body notches 40 and 64 from view. The latch and catch means on opposite ends are preferably spaced like distances from one of the body sides to permit like directed knob 56 movements for securing or detaching the griddle 12 to and from the body 14.

It should be noted that the latches 54 and the catches 38 are respectively widely transversely spaced apart. When using a three-ply 0.065 inch thick stainless steel removable griddle 12, it was found that by so spacing the latches and catches the griddle would not warp at the corners due to heat caused stresses therein. Any griddle warpage due to heat caused stresses apparently was confined to the griddle cooking area wherein it is believed the warpage was limited by the peripheral integrally formed ridge 34.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a cooking appliance, a removable cooking member having a depending peripheral flange, a bowl shaped body member supporting the cooking member inside of said flange, a carrying handle at each of two opposing body member ends and each having support means extending through the respective body ends to the inside thereof, each body member opposing end having a central transversely elongated opening extending below the depending flange, a latch bar transversely slidably mounted inside of each opposing body end and each having elongated apertures for receiving the support means to limit the transverse travel of said latch bar, latch means on the latch bar, a latch operating handle outside the body at each opposing end and each having a support bar extending through the respective central opening and being respectively rigidly attached to a latch bar, catch means on the cooking member underside and being disposed transversely adjacent and immediately below the latch means, the operating handle being movable for transversely sliding the latch bar for engaging the latch means with the catch means to lock the members together, and the elongated apertures limiting the transverse travel for preventing engagement of the support bars with the respective body opening edges.

2. In an electric grill, a removable griddle having an integrally formed peripheral upwardly-extending downwardly-opening grooved portion with an outer depending flange, a bowl shaped body member having an upper edge in said downwardly opening grooved portion for supporting the griddle and having three symmetrically spaced apart elongated downwardly extending notches in each of two opposing body ends, the depending flange having two catch means on its lower end at each of two opposing griddle ends, the catch means extending inwardly through the outer two notches respectively at each body opposing end, a latch bar inside the body member on each body member opposing end, a pair of latch means on each latch bar upper edge and extending outwardly toward said outer notches in a transversely adjacent and vertically higher relation to the respective catch means, a slide member disposed between each bar and its adjacent body end and each having inwardly extending tabs slidably supporting the respective latch bar, a pair of sleeves extending through each body opposing end for stationarily attaching the slide member thereto, each bar having an elongated aperture inwardly adjacent each sleeve, two carrying handles outside the body member and having support means respectively stationarily extending through the sleeves and their adjacent elongated apertures, and a latch operating knob outside each body opposing end and being mounted on a support bar which extends through the respective body end center notch and is rigidly attached to the latch bar for moving the latch means into locking engagement with its adjacent catch means.

3. In a cooking appliance, a removable cooking member, a body member supporting the cooking member, a handle on each of two opposing ends of the body member and having support means extending through the respective body sides, a latch bar slidably mounted on one of the body ends and having an elongated aperture through which one of the support means extend, means on the body other end and the cooking member for removably securing the members together, the cooking member having catch means adjacent the latch bar, the one body end having an aperture, means on the latch bar extending through the aperture to outside the appliance for actuating said latch for disengaging the latch means from the latch bar by movement thereof along the one end, and the one support means engaging the latch bar in the aperture for limiting such movement for preventing the means from engaging the body aperture edges.

References Cited in the file of this patent
UNITED STATES PATENTS

| | | |
|---|---|---|
| 1,485,815 | Robertson | Mar. 4, 1924 |
| 2,850,616 | Hatch | Sept. 2, 1958 |
| 2,872,560 | Bowles | Feb. 3, 1959 |
| 2,893,307 | Rodriguez | July 7, 1959 |